US008380862B2

(12) United States Patent
Hiller et al.

(10) Patent No.: US 8,380,862 B2
(45) Date of Patent: Feb. 19, 2013

(54) METHOD AND APPARATUS FOR USER-SPECIFIC WEBSITE CLAIMING

(75) Inventors: Dean Hiller, Shrub Oak, NY (US); James McCrossin, San Jose, CA (US); Steven J. Marks, San Jose, CA (US); Peter K. Petterson, San Jose, CA (US); Karen Janowski, Los Altos, CA (US); Raymond J. Holland, Scottsdale, AZ (US); Mor Hezi, Sunnyvale, CA (US); Byron Stephen Lee, San Jose, CA (US)

(73) Assignee: Fan Chiang Holdings, LLC, Wilmington, DE (US)

( * ) Notice: Subject to any disclaimer, the term of this patent is extended or adjusted under 35 U.S.C. 154(b) by 2324 days.

(21) Appl. No.: 09/728,107

(22) Filed: Nov. 30, 2000

(65) Prior Publication Data

US 2002/0065923 A1 May 30, 2002

(51) Int. Cl.
*G06F 15/16* (2006.01)
*G06F 7/04* (2006.01)

(52) U.S. Cl. ............................ 709/229; 709/219; 726/21

(58) Field of Classification Search .................. 705/1, 8, 705/26; 707/217, 227, 206, 245, 250; 713/202; 379/196, 201.01; 709/206, 217, 227, 245, 709/250, 229
See application file for complete search history.

(56) References Cited

U.S. PATENT DOCUMENTS

| | | | | |
|---|---|---|---|---|
| 5,280,581 A * | 1/1994 | Bathrick et al. | ............... | 709/217 |
| 5,896,512 A * | 4/1999 | Einbinder et al. | ............ | 709/250 |
| 5,909,671 A * | 6/1999 | Byford et al. | ................... | 705/26 |
| 5,987,508 A * | 11/1999 | Agraharam et al. | .......... | 709/217 |
| 6,038,602 A * | 3/2000 | Ishikawa | ....................... | 709/227 |
| 6,112,078 A * | 8/2000 | Sormunen et al. | ............ | 455/411 |
| 6,418,472 B1 * | 7/2002 | Mi et al. | ........................ | 709/229 |
| 6,788,769 B1 * | 9/2004 | Waites | .......................... | 709/206 |
| 2001/0012350 A1 * | 8/2001 | Ehlinger | ....................... | 379/196 |
| 2001/0039592 A1 * | 11/2001 | Carden | ......................... | 709/245 |
| 2002/0026489 A1 * | 2/2002 | Homma | ....................... | 709/206 |
| 2002/0031211 A1 * | 3/2002 | Fullarton et al. | ......... | 379/201.01 |
| 2002/0038233 A1 * | 3/2002 | Shubov et al. | .................... | 705/8 |
| 2002/0087892 A1 * | 7/2002 | Imazu | ........................... | 713/202 |
| 2003/0149583 A1 * | 8/2003 | Ergezinger et al. | ............... | 705/1 |

\* cited by examiner

*Primary Examiner* — Paul H Kang
(74) *Attorney, Agent, or Firm* — Woodcock Washburn LLP

(57) ABSTRACT

A system and method for claiming a user-specific website associated to a user's telephone number is disclosed. The present invention provides for user identity verification through telephone number detection. The user-specific website requested is associated to the telephone number of the requesting user. This prevents the potential for anonymity, which is found in present methods. Potential users must "authenticate" that they have access to the phone number of the website that they are attempting to claim. Website claiming can be done by first requesting a user-specific website online and then accessing the system's telephone service for phone number verification. In the alternative, website claiming can be performed by first calling the system phone number for phone verification, followed by online website claim completion.

10 Claims, 9 Drawing Sheets

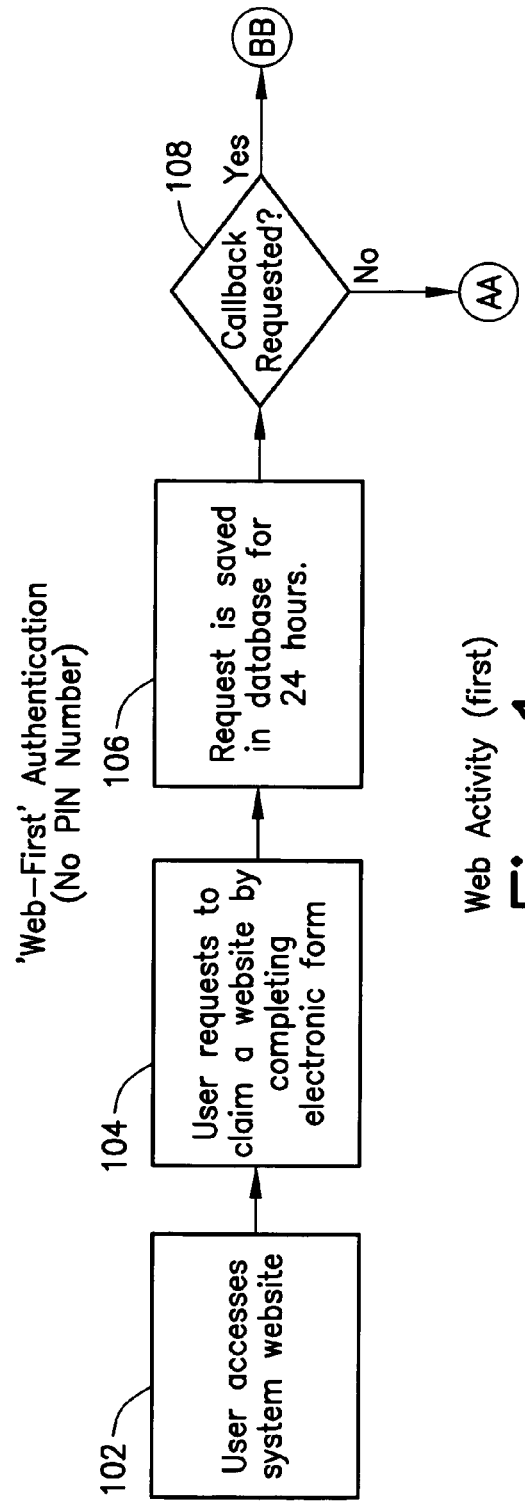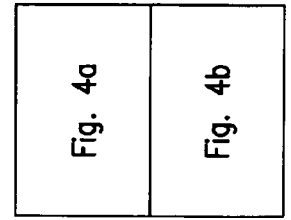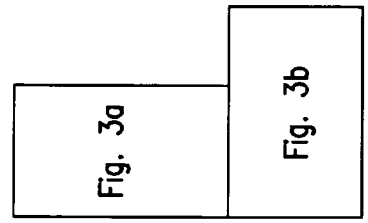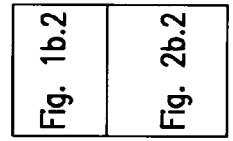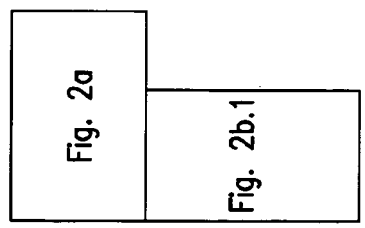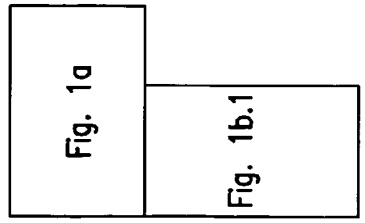

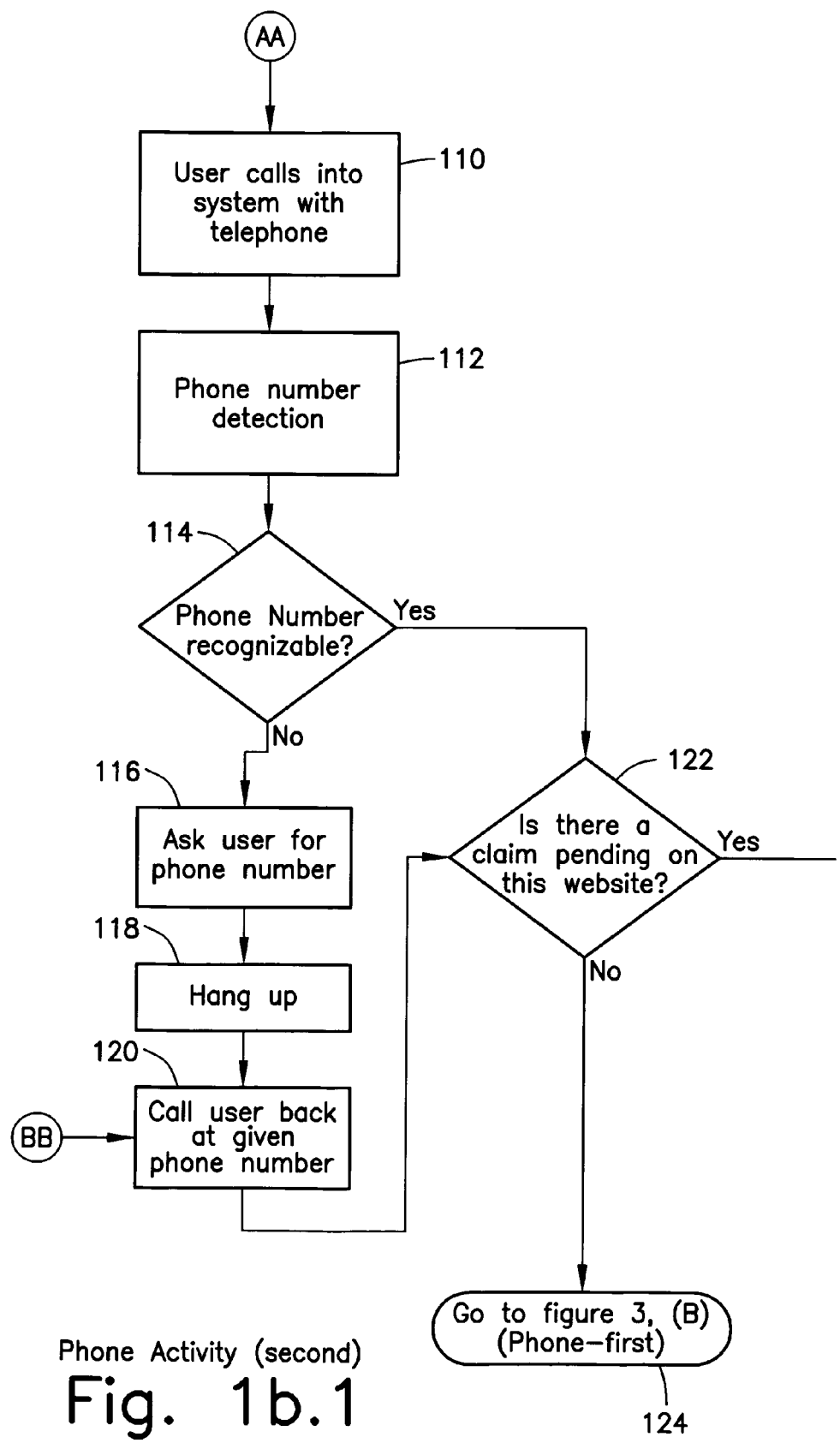
Phone Activity (second)
Fig. 1b.1

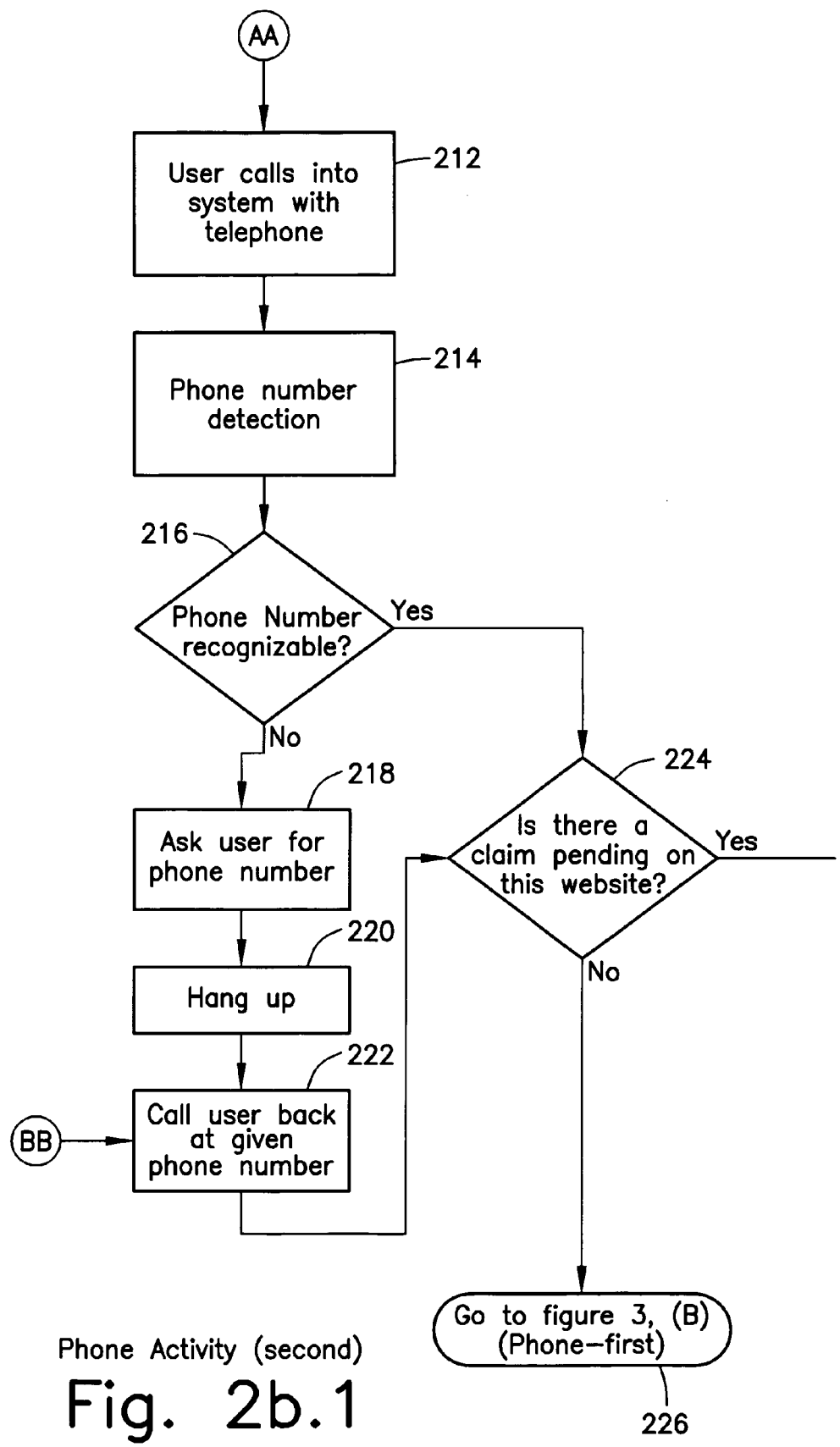
Phone Activity (second)
Fig. 2b.1

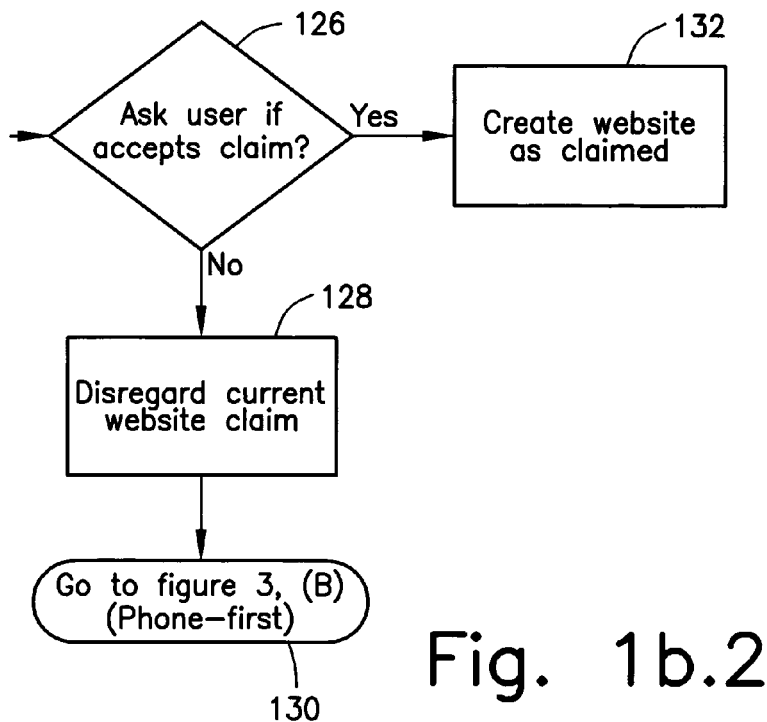
Fig. 1b.2
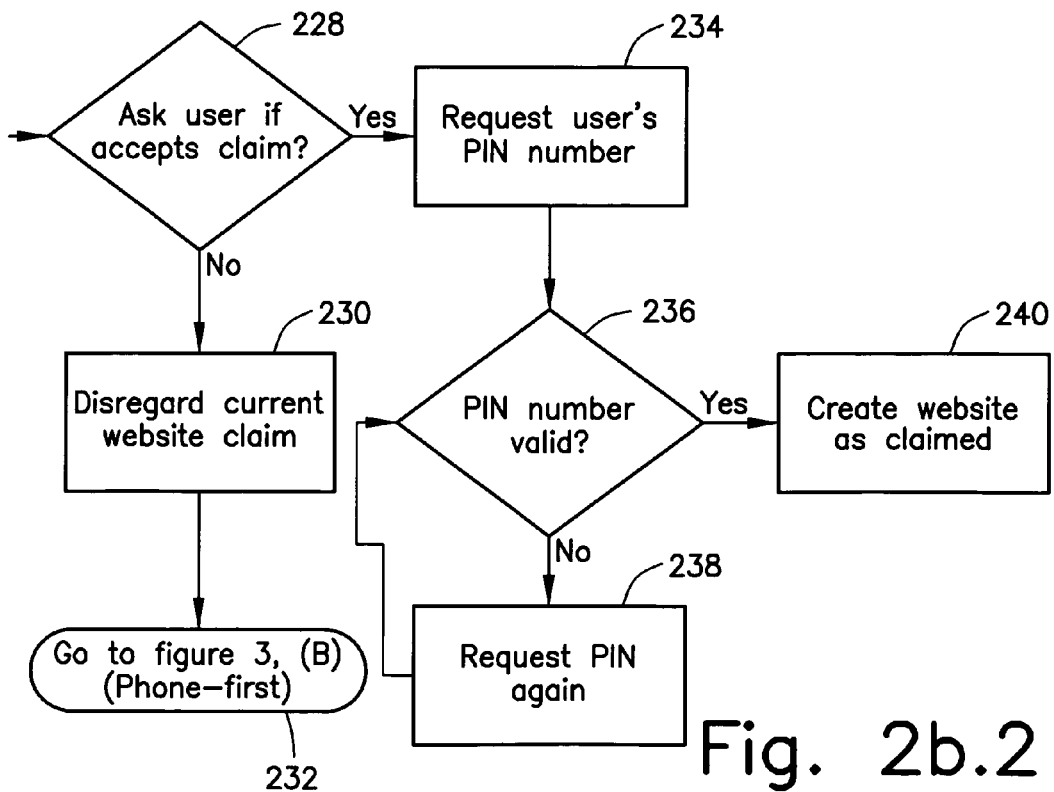
Fig. 2b.2

Phone Activity (First)

Web Activity (Second)

METHOD AND APPARATUS FOR USER-SPECIFIC WEBSITE CLAIMING

BACKGROUND INFORMATION

Several different methods exist in the art for registration of a new user to an Internet service. Many Internet services simply request that a user provide a login name and a password, leaving the creation of these identifiers completely up to the user. Other Internet services require that a new user fill out an electronic form before being given access. Fields in these forms typically include such things as name, address, and phone number. This provides the system operator a slightly greater level of knowledge about the new user, but only if the user chooses to tell the truth when completing the form. Methods of Internet service registration in the art provide no means of verifying the accuracy of the information provided by the user and tie no verifiable identifier to the user.

This potential for anonymity provides users the temptation to perform acts that they might not normally consider. The lack of accountability for users can also bring down the general level of communication decency within the Internet service.

It is therefore desirable to have a method for Internet system registration that requires a level of user verification to assure user accountability and to maintain an overall quality of service.

SUMMARY OF THE INVENTION

A system and method are disclosed for claiming a user-specific website. The present invention provides for user identity verification through telephone number detection. The user-specific website requested is associated to the telephone number of the requesting user. This prevents the potential for anonymity, which is found in present methods.

In an embodiment of the present invention, called 'Web-First' Authentication, a user begins the process of claiming a user-specific website by accessing an Internet website of the service. In order for a user to claim a website, he/she must complete an electronic form at the Internet service's website. In an embodiment, the website claim remains valid for some predefined length of time, such as twenty-four hours.

The user can then either have the system call him/her back at a specified number or the user can call into the system to complete the website claiming process. Upon receipt of the phone call, the system of the present invention determines the user's phone number by utilizing a phone number detection service, such as the Automatic Number Identification (ANI) service provided by various national phone service providers. Upon verification that there is a claim pending for a user-specific website associated to that phone number and the user accepts this claim, the user-specific website is created as claimed.

Another possible embodiment of the present invention, called 'Phone-First' Authentication, operates in the reverse order of 'Web-First' Authentication. In this embodiment, a user first calls into the system to establish a claim to a user-specific website. A phone number detection service such as ANI determines from what phone number the user is calling. Next, the phone service provides the user with a personal identification number (PIN) to be used for website claim completion.

In an embodiment of the present invention, the user next accesses the service's Internet website. The user then inputs said PIN upon request. This provides verification to the system of the user's identity, and the user-specific website is then created as claimed.

Other possible embodiments of the present invention provide for having the user-specific website associated to the phone number of a pager or a fax machine. The system would, in these cases respectively, send the PIN to the display of the pager or the output of the fax machine.

BRIEF DESCRIPTION OF THE DRAWINGS

FIG. 1 provides a flowchart illustrative of the process of 'Web-First' Authentication.

DETAILED DESCRIPTION

Figure 2A:
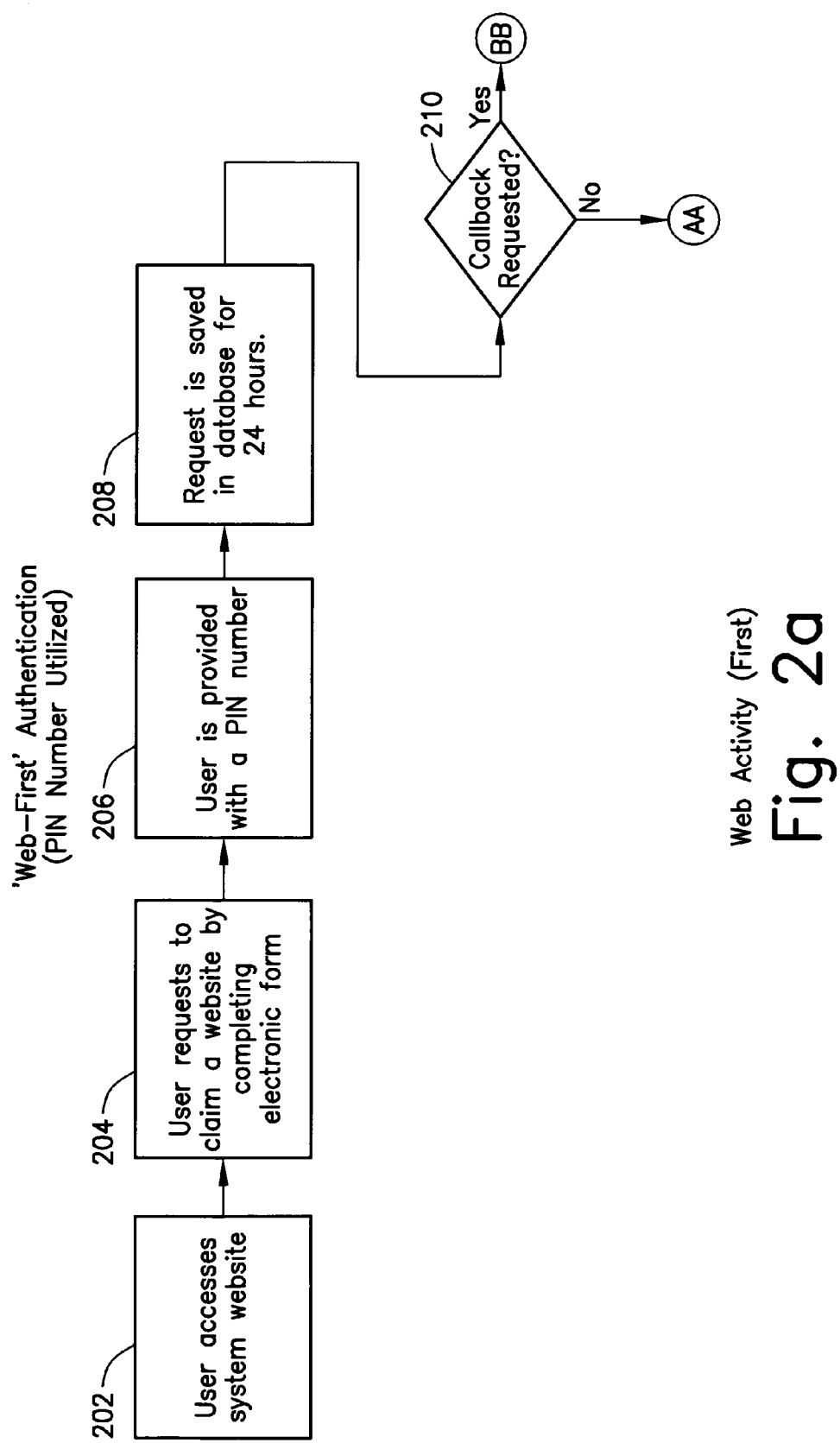
FIG. 2 illustrates the usage of a personal identification number (PIN) in the process of 'Web-First' Authentication.

FIG. 1 provides a flowchart illustrative of the process of 'Web-First' Authentication. Specifically, FIG. 1*a* provides the 'web activity' portion of the authentication, and FIG. 1*b* provides the 'phone activity' portion of the authentication. In one embodiment of the present invention, a registering user accesses the Internet web site of the system 102, whereupon a request is made by the user to claim a user-specific website that will be associated with the user's telephone number. In an embodiment of the present invention, this request is made by filling out an electronic form at the system web site 104. The request is saved in a database and will remain valid for a predefined period of time (e.g. twenty-four hours) 106. The user is then asked 108 whether he/she wishes to have the system perform a 'call-back' or whether he/she would like to call into the system themselves.

In an embodiment of the present invention, if the user did not request a 'call-back,' the user next calls into the system 110 from the telephone number given to the system by the user via the electronic form. The system determines what telephone number the user is calling from by using a telephone number detection service 112, such as the Automatic Number Identification (ANI) service provided by various national phone service providers. If the phone number is not recognizable or the phone number is not attainable for another reason 114, the user is asked by the system for the phone number from which the user is calling 116. Upon attaining the number from the user, the system hangs up 118 and calls the user back at the phone number provided by the user 120. This provides an alternative means of verifying the number from which the user is calling. If the user had requested during the 'web activity' that the system perform a 'call-back,' the 'phone activity' process would begin at this point with the system calling the user 120. As used herein, the device that receives the phone call (i.e., the phone call receiving device), whether at the system or the user, is a hardware device (or a hardware device that is capable of executing software) such as a telephone (see, e.g., FIG. 1), a call system as described above, a pager, a fax machine, etc.

In an embodiment of the present invention, after attaining the number from which the user is calling, the system determines whether there is a website claim pending in the database that is associated to this telephone number 122. If a website claim does not exist for the number, the system begins the process of 'Phone-First' Authentication 124 (See FIG. 3, entrance point B). If a website claim does exist for the telephone number, the user is presented with the information pertaining to this website claim, and the user is asked if the user wishes to accept the claim 126. If, after reviewing the website claim, the user decides to not accept the website claim, the claim is disregarded 128, and the process of 'Phone-First' Authentication begins 130 (See FIG. 3, entrance point B). If, however, the user accepts the website claim, the user's user-specific website is created as requested by the user 132.

FIG. 2 illustrates the usage of a personal identification number (PIN) in the process of 'Web-First' Authentication. Specifically, FIG. 2a provides the 'web activity' portion of the authentication, and FIG. 2b provides the 'phone activity' portion of the authentication. In one embodiment of the present invention, the user first accesses the system website 202 to request a user-specific website that will be associated to the user's telephone number. The user requests to claim a website by completing an electronic form online 204. Upon receipt of the information provided in this electronic form, the system provides the user with a PIN 206 to be used later in completing the registration (claiming) process. As is stated above, in one embodiment, the PIN may alternatively be provided to the user via a pager or a fax machine, provided the user wishes the website be related to that phone number. The request is stored in a database, and the website claim remains valid for a predefined period of time (e.g. twenty-four hours) 208. The user is then asked 210 whether he/she wishes to have the system perform a 'call-back' or whether he/she would like to call into the system themselves.

In an embodiment of the present invention, if the user did not request a 'call-back,' the user next calls into the system 212 from the telephone number given to the system by the user via the electronic form. The system determines what telephone number the user is calling from by using a telephone number detection service 214, such as the ANI service. If the phone number is not recognizable or the phone number is not attainable for another reason 216, the user is asked by the system for the phone number from which the user is calling 218. Upon attaining the number from the user, the system hangs up 220 and calls the user back at the phone number provided by the user 222. If the user had requested during the 'web activity' that the system perform a 'call-back,' the 'phone activity' process would begin at this point with the system calling the user 222.

In an embodiment of the present invention, after attaining the number from which the user is calling, the system determines whether there is a website claim pending in the database that is associated to this telephone number 224. If a website claim does not exist for the number, the system begins the process of 'Phone-First' Authentication 226 (See FIG. 3, entrance point B). If a website claim does exist for the telephone number, the user is presented with the information pertaining to this website claim, and the user is asked if he/she wishes to accept the claim 228. If, after reviewing the website claim, the user decides to not accept the website claim, the claim is disregarded 230, and the process of 'Phone-First' Authentication begins 232 (See FIG. 3, entrance point B). If the user accepts the website claim, the system requests of the user the user's PIN 234. Upon receipt of the user's PIN, the system determines whether the PIN is valid 236. If the PIN is not correct for the claim of the user-specific website, the user is allowed to re-enter the PIN 238. If, however, the PIN is correct, the user's user-specific website is created as requested by the user 240.

Figure 3A:
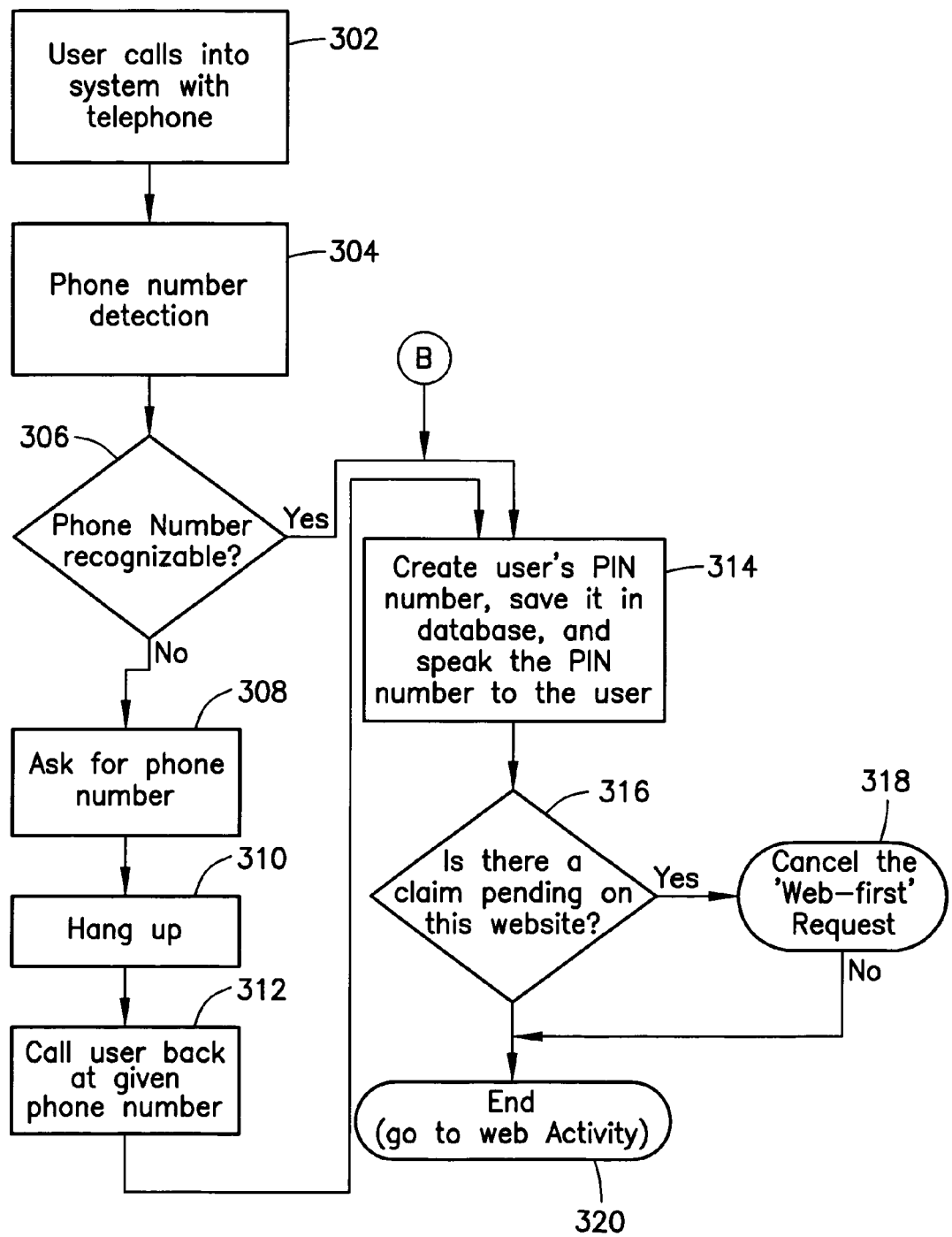
FIG. 3 provides a flowchart representing the process of 'Phone-First' Authentication.
Figure 3B:
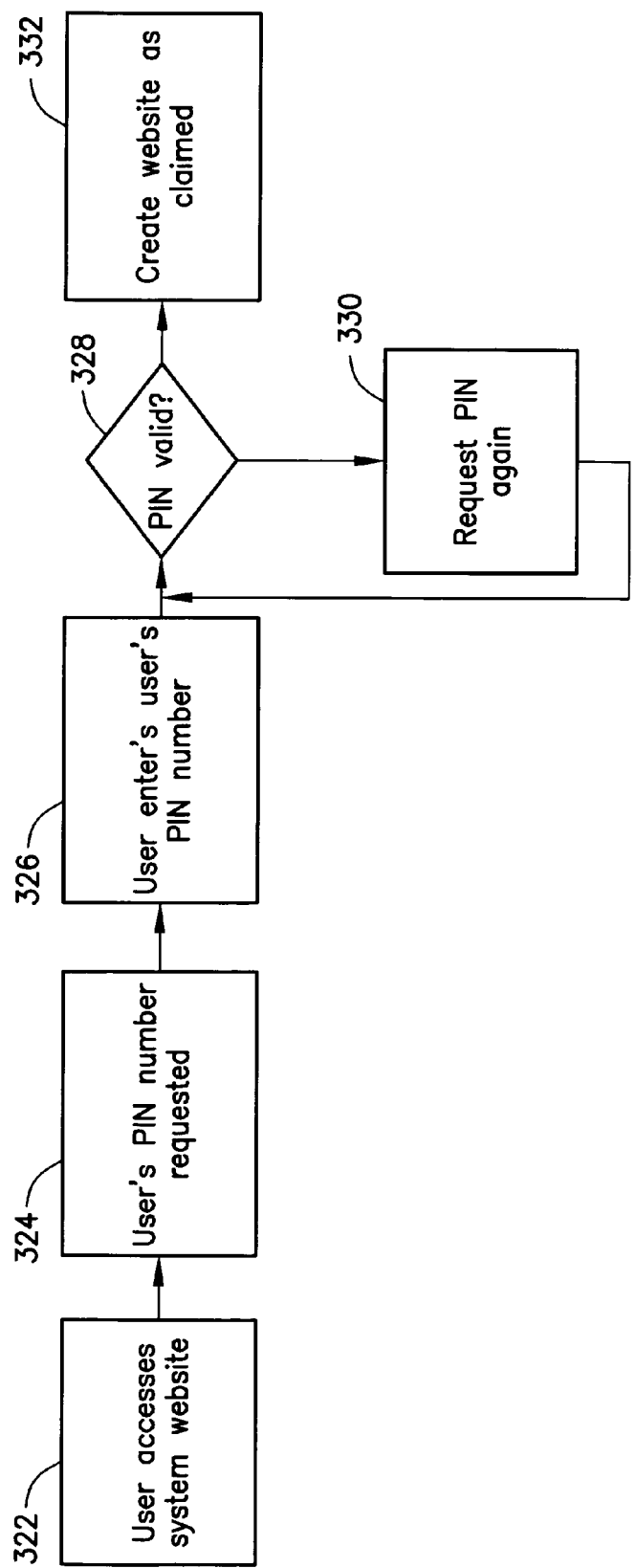

FIG. 3 provides a flowchart representing the process of 'Phone-First' Authentication. In an embodiment of the present invention, a user performs the telephone portion of the website registration (claiming) process before the web portion. A user first calls into the system 302 from the telephone number that the user wishes to be associated to the user-specific website. The system determines what telephone number the user is calling from by using a telephone number detection service 304, such as the ANI service. If the phone number is not recognizable or the phone number is not attainable for another reason 306, the user is asked by the system for the phone number from which the user is calling 308. Upon attaining the number from the user, the system hangs up 310 and calls the user back at the phone number provided by the user 312.

In an embodiment of the present invention, after attaining the (verified) number from which the user is calling, the user is asked various questions and is provided with a computer-generated PIN 314. (As stated above, providing this information via pager or fax machine is also contemplated.) The system then determines whether or not there is already a website claim pending for the number determined to be the user's 316. If there is already a website claim, the pending 'Web-First' claim is then canceled 318. If there is no pending claim, no further 'Phone-Activity' occurs. The user is then finished with the telephone portion of the registration (website claiming) process 320, and he/she begins the web portion 322.

In an embodiment of the present invention, the user next accesses the system website 322 to complete the website claiming process. The system requests from the user the user's PIN 324. If the PIN received 326 is incorrect for the website claimed 328, the user is asked to re-enter the PIN 330. If, however, the PIN is correct, the user's user-specific website is created as requested by the user 332.

Figure 4A:
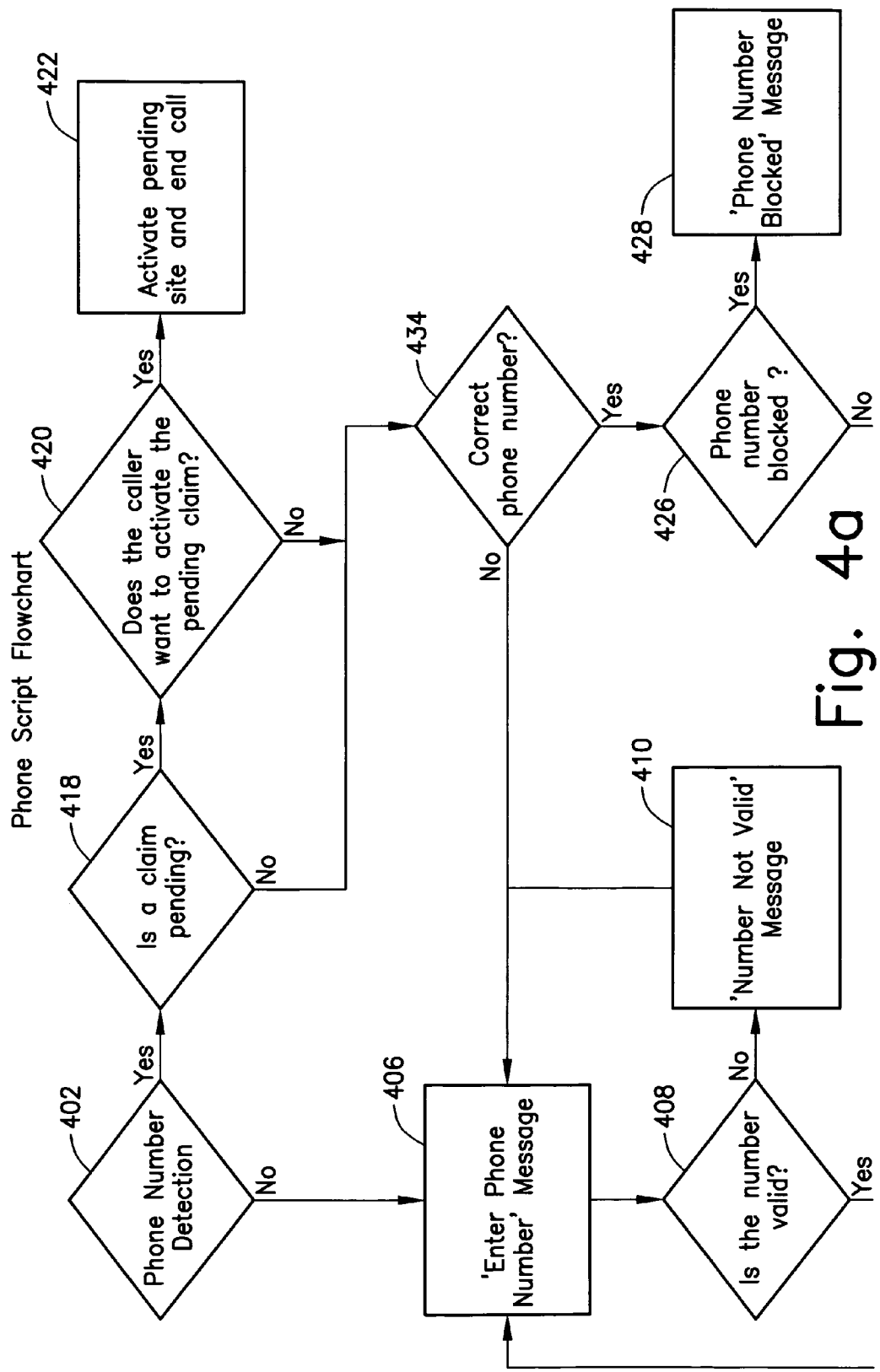
FIG. 4 provides a flowchart of the phone script of the system.
Figure 4B:
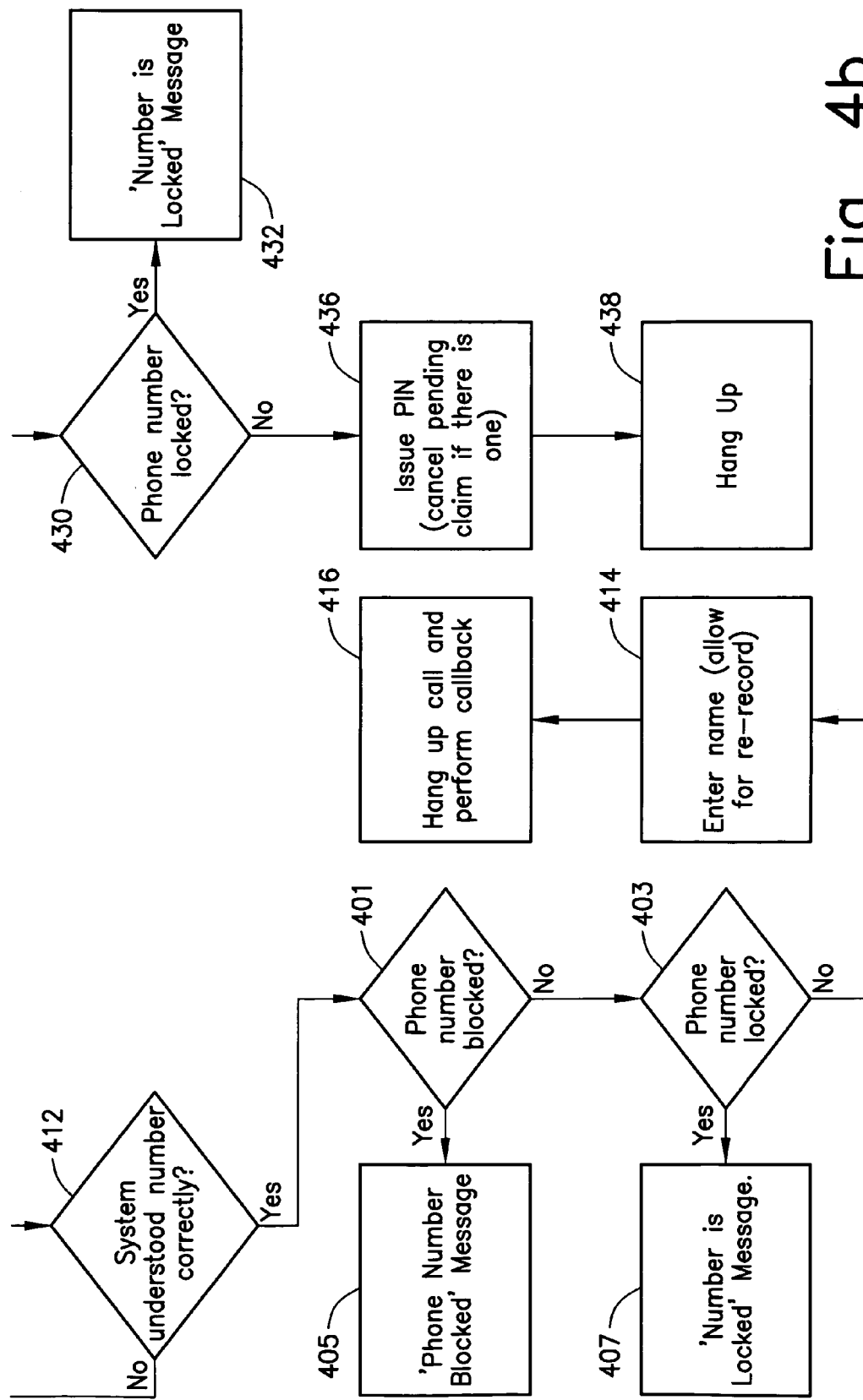

FIG. 4 provides a flowchart of the phone script of the system. The flowchart describes the alternative paths of the telephone portion of website registration. In one embodiment, upon receipt of a phone call into the system from a specific phone number, the system tries to recognize the number via a system such as ANI 402. If a valid telephone number is not recognized, the user is asked to input the phone number from which the user is calling 406. The system then checks to see if the number is valid (ten numeric digits, etc.) 408. If the number is not valid, the user is told this 410 and is asked to re-enter the number 406. After recognition, the user is told the phone number that was understood by the system and asked if it is correct 412. If it is not the correct number 412, the system asks the user to re-enter the phone number 406. If the number is identified by the user to be correct, the system determines 401 whether the phone number is one of several phone numbers held by a single entity and associated to a single, entity-specific website. If so, the user is told that the telephone number is 'blocked' and that it cannot be claimed 405. Further, if there is a website associated to the number that is already owned by another user 403 and the owner does not wish to allow additional websites to be associated to the phone number, the user is notified that the number is 'locked' and cannot be claimed 407. If the number is neither 'blocked' nor 'locked,' the system asks the user for his/her name and any other necessary information 414, and then the system hangs up and performs the 'call-back' routine 416 (See 308, 310, 312 of FIG. 3).

In an embodiment of the present invention, if a valid phone number was detected by the system for the user, the system determines whether or not a website claim associated to that number is pending 418. If so, the user is told about the pending claim and is asked if he/she wants to activate the claim 420. If the user wishes to activate the pending user-specific website claim, the call is terminated and the website is created as claimed 422. If either no website claim is pending or the user does not wish to activate the pending claim, the system then provides the user with the phone number that the system detected to be the user's telephone number and asks the user if it is correct 434. If the user states that the phone number is not correct, he/she is asked to enter the correct phone number 406, as a beginning of the telephone 'call-back' routine. If the number is identified by the user to be correct, the system determines whether the phone number is one of several phone numbers held by a single entity and associated to a single, entity-specific website 426. If so, the user is told that the telephone number is 'blocked' and that it cannot be claimed 428. Further, if there is a website associated to the number that is already owned by another user 430 and the owner does not wish to allow additional websites to be associated to the phone number, the user is notified that the number is 'locked' and cannot be claimed 432. If the number is neither 'blocked' nor 'locked,' the user is provided with a PIN 436 to be used for the web portion of the registration (claiming) process and the system ends the call 438.

The invention claimed is:

1. A system configured to claim a user-specific website, comprising:
   a phone call receiving device configured to receive telephonic communications; and
   a phone number detection device communicatively coupled to said phone call receiving device and configured to identify a source phone number when a phone call is received at the phone call receiving device;
   wherein the system is configured to:
   in response to receiving a request for a user-specific website, the request including at least one phone number associated with the request, effect a claim to the user-specific website based on verification of the at least one phone number by the phone number detection device, said verification comprising:
      determining that the claim is pending and receiving additional confirmation that the claim should be activated;
      verifying that the at least one phone number is a valid phone number, that the at least one phone number is not blocked, and that the at least one phone number is not locked; and
      providing a personal identification number (PIN) for subsequent registration completion via a web interface; and
   in response to receiving the request by the phone call receiving device, effect the claim to the user-specific website based on verification of the at least one phone number by the phone number detection device and confirmation of the request via the web interface, said confirmation comprising:
      determining that the claim is pending and receiving additional confirmation that the claim should be activated;
      prompting for entry of the source phone number when the at least one phone number is not detected by the phone number detection device and verifying that the entered source phone number is a valid phone number, that the entered source phone number is not blocked, and that the entered source phone number is not locked; and
      prompting for entry of a name associated with the request for the user-specific website and initiating a call back routine.

2. The system of claim 1, wherein the system is further configured to effect the claim by receiving telephone communications via the at least one phone number associated with the request indicating confirmation of the request.

3. The system of claim 1, wherein the system is further configured to accept the request based on completion of an electronic form via the web interface.

4. The system of claim 1, wherein the claim is valid for a pre-defined length of time.

5. The system of claim 1, wherein the verification further comprises receiving indication of the at least one phone number by the phone call receiving device and calling the at least one phone number.

6. A method of claiming a website, comprising:
   in response to receiving a request for a user-specific website via a system website, the request including at least one phone number associated with the user-specific website, detecting, by a phone number detection device, a source phone number of a phone call received at a phone call receiving device and confirming a website claim by verifying that the at least one phone number associated with the user-specific website corresponds to the source phone number detected by the phone number detection device, said confirming further comprising:
      determining that the website claim is pending and receiving additional confirmation that the website claim should be activated; and
      verifying that the at least one phone number is a valid phone number, that the at least one phone number is not blocked, and that the at least one phone number is not locked; and
   in response to receiving the request for the user-specific website via the phone call receiving device, detecting, by the phone number detection device, the source phone number of the phone call received at the phone call receiving device, and confirming the website claim by providing a personal identification number (PIN) during the phone call and receiving the PIN via the system website, said confirming further comprising:
      determining that the website claim is pending and receiving additional confirmation that the website claim should be activated;
      prompting for entry of the source phone number when the at least one phone number is not detected by the phone number detection device;
      verifying that the entered source phone number is a valid phone number, that the entered source phone number is not blocked, and that the entered source phone number is not locked; and
      prompting for entry of a name associated with the request for the user-specific website and initiating a call back routine.

7. The method of claim 6, further comprising:
   effecting the website claim in response to said confirming.

8. The method of claim 6, wherein the request is generated by completion of an electronic form at the system website.

9. The method of claim 6, wherein the website claim is valid for a pre-defined length of time.

10. The method of claim 6, wherein the at least one phone number is verified by disconnecting the phone call and establishing another phone call using the at least one phone number.

* * * * *